United States Patent [19]

Minagawa et al.

[11] Patent Number: 4,872,793
[45] Date of Patent: Oct. 10, 1989

[54] METHOD OF AND APPARATUS FOR SERRATING A STEERING WHEEL

[75] Inventors: Takehiro Minagawa; Toshio Stou; Masao Miyata, all of Fuji; Kenji Nemoto; Kuninobu Uchida, both of Sayama, all of Japan

[73] Assignees: Nihon Plast Co., Ltd., Shizuoka; Honda Giken Kogyo Kabushiki Kaisha, Tokyo, both of Japan

[21] Appl. No.: 252,998

[22] Filed: Oct. 4, 1988

[30] Foreign Application Priority Data

Oct. 7, 1987 [JP] Japan ................ 62-252661

[51] Int. Cl.$^4$ .......................... B23D 37/10
[52] U.S. Cl. ..................... 409/244; 279/74; 409/259; 409/277; 409/278; 409/287
[58] Field of Search ............ 409/244, 256, 276, 281, 409/282, 287, 231, 232, 234, 259, 277, 278; 279/1 B, 57, 74, 75, 78, 82

[56] References Cited

U.S. PATENT DOCUMENTS 1,802,053  4/1931  Halborg ..................... 279/74 X
2,259,969 10/1941  Bake ........................ 409/287 X
3,199,409  8/1965  Bryant et al. ............... 409/287

Primary Examiner—Z. R. Bilinsky
Attorney, Agent, or Firm—Birch, Stewart, Kolasch & Birch

[57] ABSTRACT

The boss of a steering wheel is serrated by setting the steering wheel on a serrating broaching machine, inserting a serrating broach into a through hole defined in the boss of the steering wheel, and then pulling the serrating broach with a broach chuck gripping the serrating broach to cut serrations on an inner surface of the through hole in the boss. The steering wheel is positioned nonrotatably in a prescribed angular orientation on the broaching machine while placing the boss on a holder of the broaching machine. Then, the serrating broach is inserted through the through hole in the boss into the holder of the broaching machine while holding the serrating broach in a prescribed angular orientation around the axis thereof with respect to the broach chuck. Finally, the serrating broach is pulled from the boss with the broach chuck gripping the serrating broach to cut serrations on the inner surface of the boss.

7 Claims, 4 Drawing Sheets

FIG.4
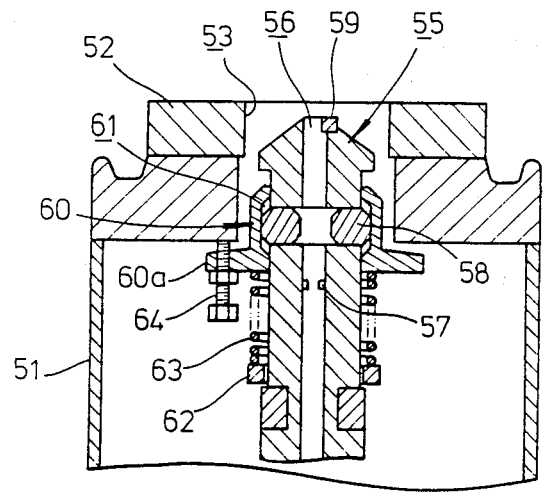
FIG.5
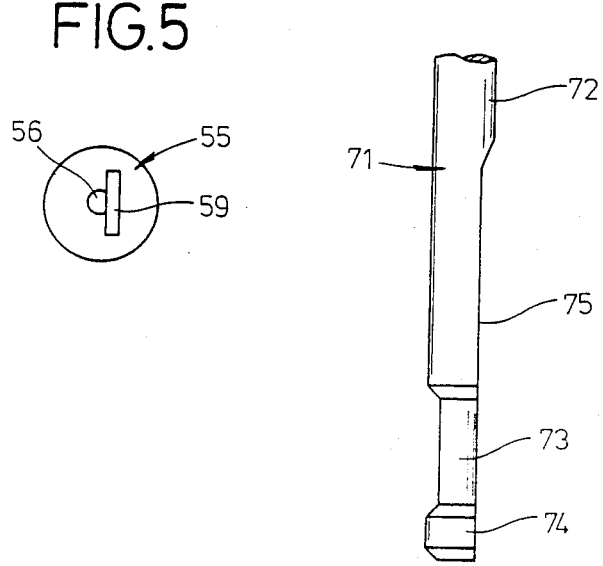
FIG.6

FIG.7
FIG.8
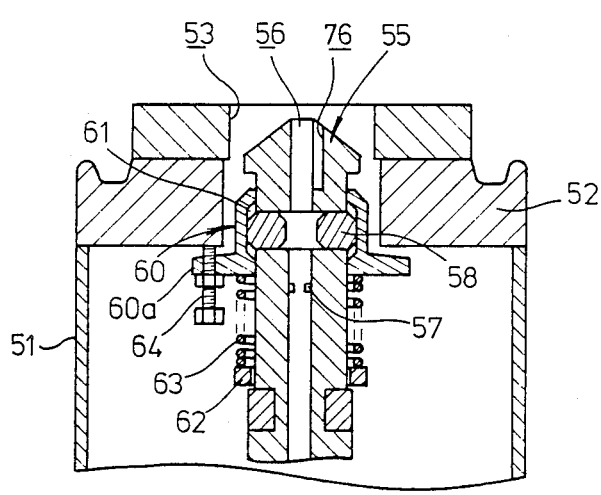
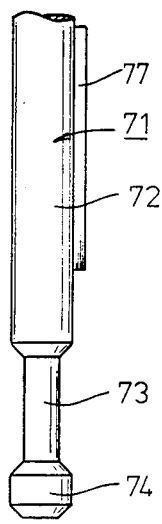

METHOD OF AND APPARATUS FOR SERRATING A STEERING WHEEL

BACKGROUND OF THE INVENTION

The present invention relates to a method of and an apparatus for serrating a steering wheel, and more particularly to a method of and an apparatus for serrating the boss of a steering wheel of an automobile or the like at a constant position to provide for splined engagement with a steering shaft.

One conventional apparatus for serrating the boss of a steering wheel is illustrated in FIG. 1 of the accompanying drawings. As shown in FIG. 1, the boss 4 of a steering wheel 3 is fitted over a jig 2 having a broach insertion hole 1 defined centrally therethrough to hold a smaller metallic boss 6 slidably against the jig 2, the boss 6 being integral with the boss 4 and having a through hole 5 with its inner peripheral surface to be serrated. The jig 2 is positioned by being fitted in a central opening defined in an upper surface of a frame base 8 fixedly mounted on a chuck frame 7 secured to a broaching machine.

A hydraulically actuatable broach chuck 9 is vertically movably disposed in the chuck frame 7. The broach chuck 9 has a broach insertion hole 10 defined therethrough for insertion of a serrating broach (described later on). A broach stopper 11 projects into the broach insertion hole 10, and a plurality of chuck teeth 12 are disposed above the broach stopper 11 for movement into and out of the broach insertion hole 10. The chuck teeth 12 are normally urged to move away from each other by a spring (not shown).

A chuck cover 13 is vertically movably fitted over the broach chuck 9. The chuck cover 13 has a recess 14 defined in its inner surface for receiving the chuck teeth 12 partly therein. The chuck cover 13 is normally urged resiliently to move upwardly by a spring 15 disposed around the broach chuck 9 and engaging the lower end of the chuck cover 13. The chuck cover 13 has a flange 13a in which a bolt 16 is vertically threaded for abutting engagement with a lower surface of the frame base 8.

FIG. 2 shows a serrating broach 17 in the form of a solid cylinder including a cutting region 17a having cutting teeth shaped complementarily to serrations to be formed, a neck region 17b to be held by the chuck teeth 12, and a stopper region 17c larger in diameter than the neck region 17b.

The broach 17 is inserted into the broach insertion hole 10 of the broach chuck 9 through the hole 5 of the boss 6 and the broach insertion hole 1 of the jig 2. The broach 17 inserted in the broach insertion hole 10 has its stopper 17 held against the broach stopper 11 and the neck region 17b facing the chuck teeth 12.

In operation, the broach chuck 9 is lowered a prescribed stroke to cause the chuck cover 13 resiliently biased by the spring 15 to be lifted relatively to the broach chuck 9. Now, the lower edge of the recess 14 of the chuck cover 13 pushes the chuck teeth 12 radially inwardly toward each other to grip the neck region 17b of the broach 17. During this time, the broach chuck 9 and the broach 17 are centered in coaxial alignment with each other, and the boss 6 of the steering wheel 3 slides over the upper surface of the jig 2 into coaxial alignment with the broach chuck 9 and the broach 17.

Then, the broach chuck 9 is lowered and the broach 17 is pulled out through the boss 6 to enable the cutting teeth of the cutting region 17a of the broach 17 to cut serrations on the inner surface of the through hole 5 of the boss 6.

In the above conventional serrating method and apparatus, however, the broach 17 is not positioned angularly about its central axis, i.e., in a direction normal to the axis thereof in serrating the boss 6. Therefore, the serrations formed on the boss of the steering wheel tend to be out of proper positional relationship to a symmetrically central position or neutral position of the steering wheel.

Where the steering wheel is mounted on the steering shaft of an automobile, for example, the neutral position of the steering wheel may not necessarily correspond to the straight-ahead direction of the automobile because the angular orientation of the steering wheel is not in uniform phase with the serrations on the steering wheel boss. For example, if there are 30 teeth or grooves on the serrated inner boss surface, the angle of a pitch or angular spacing between adjacent teeth or grooves is $360° \div 30 = 12°$, and the angular orientation of the steering wheel in its neutral position may be displaced a maximum of 6° from the straight-ahead direction of the automobile.

SUMMARY OF THE INVENTION

It is a primary object of the present invention to provide a method of and an apparatus for serrating a steering wheel in a through hole of the boss thereof at a constant position at all times by holding the boss of the steering wheel in constant relative positional relation to a serrating broach.

Another object of the present invention is to provide a method for serrating a steering wheel by setting the steering wheel on a serrating broaching machine, inserting a serrating broach into a through hole defined in a boss of the steering wheel, and then pulling the serrating broach with a broach chuck gripping the serrating broach to cut serrations on an inner surface of the through hole in the boss. The method comprises the steps of: positioning the steering wheel nonrotatably in a prescribed angular orientation on the broaching machine while placing the boss on a holder of the broaching machine; inserting the serrating broach through the through hole in the boss into the holder of the broaching machine while holding the serrating broach in a prescribed angular orientation around the axis thereof with respect to the broach chuck; and pulling the serrating broach from the boss with the broach chuck gripping the serrating broach to cut serrations on the inner surface of the boss.

Still another object of the present invention is to provide an apparatus for serrating a steering wheel by setting the steering wheel on a serrating broaching machine, inserting a serrating broach into a through hole defined in a boss of the steering wheel, and then pulling the serrating broach with a broach chuck gripping the serrating broach to cut serrations on an inner surface of the through hole in the boss. The apparatus comprises: support means horizontally movably and nonrotatably mounted on the broaching machine for positioning the steering wheel nonrotatably in a prescribed angular orientation; a holder disposed substantially centrally in the support means for placing the boss of the steering wheel thereon; and a serrating broach insertable through the through hole in the boss, the holder, and the broach chuck, the broach chuck having positioning means for positioning the serrating broach in a prescribed angular orientation, and being operable to grip and pull the serrating broach from the boss to cut serrations on the inner surface of the boss.

Yet another object of the present invention is to provide an apparatus for serrating a steering wheel, wherein the support means comprises a mount base horizontally movable on the broaching machine, and at least one support member fixedly mounted on the mount base and having a recess for receiving a spoke of the steering wheel.

Yet still another object of the present invention is to provide an apparatus for serrating a steering wheel, wherein the mount base comprises two superposed movable plates horizontally movable in mutually perpendicular directions.

A further object of he present invention is to provide an apparatus for serrating a steering wheel, wherein the serrating broach has a flat surface on a side thereof which extends axially thereof, the positioning means comprising a positioning block for engaging the flat surface for holding the serrating broach in the prescribed angular orientation.

A still further object of the present invention is to provide an apparatus for serrating a steering wheel, wherein the serrating broach has a key projecting on a side thereof and extending axially thereof, the positioning means comprising a key slot for receiving the key therein.

The above and other objects, features and advantages of the present invention will become more apparent from the following description when taken in conjunction with the accompanying drawings in which preferred embodiments of the present invention are shown by way of illustrative example.

The present invention will become more fully understood from the detailed description given hereinbelow and the accompanying drawings which are given by way of illustration only, and thus, are not limitative of the present invention, and wherein:

BRIEF DESCRIPTION OF THE DRAWINGS

FIG. 4 is a cross-sectional view of a broach chuck in the serrating apparatus shown in FIG. 3;

FIG. 5 is a plan view of the broach chuck shown in FIG. 4;

FIG. 6 is a fragmentary side elevational view of a serrating broach for use in the serrating apparatus shown in FIG. 3;

FIG. 7 is a fragmentary cross-sectional view of a serrating apparatus according to another embodiment of the present invention; and FIG. 8 is a fragmentary side elevational view of a serrating broach for use in the serrating apparatus illustrated in FIG. 7.

DETAILED DESCRIPTION OF THE PREFERRED EMBODIMENTS

Figure 1:
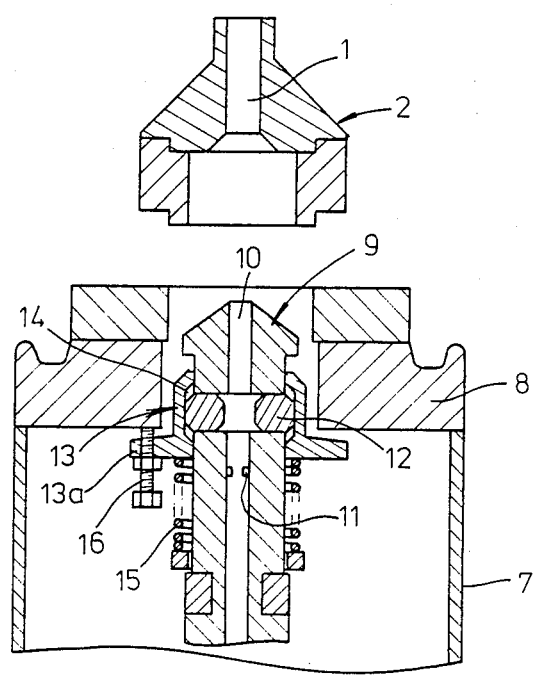
FIG. 1 is a fragmentary cross sectional view of a conventional serrating apparatus.
Figure 2:
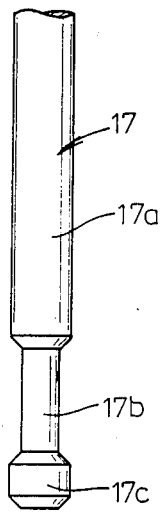
FIG. 2 is a fragmentary side elevational view of a serrating broach for us in the conventional serrating apparatus.
Figure 3:
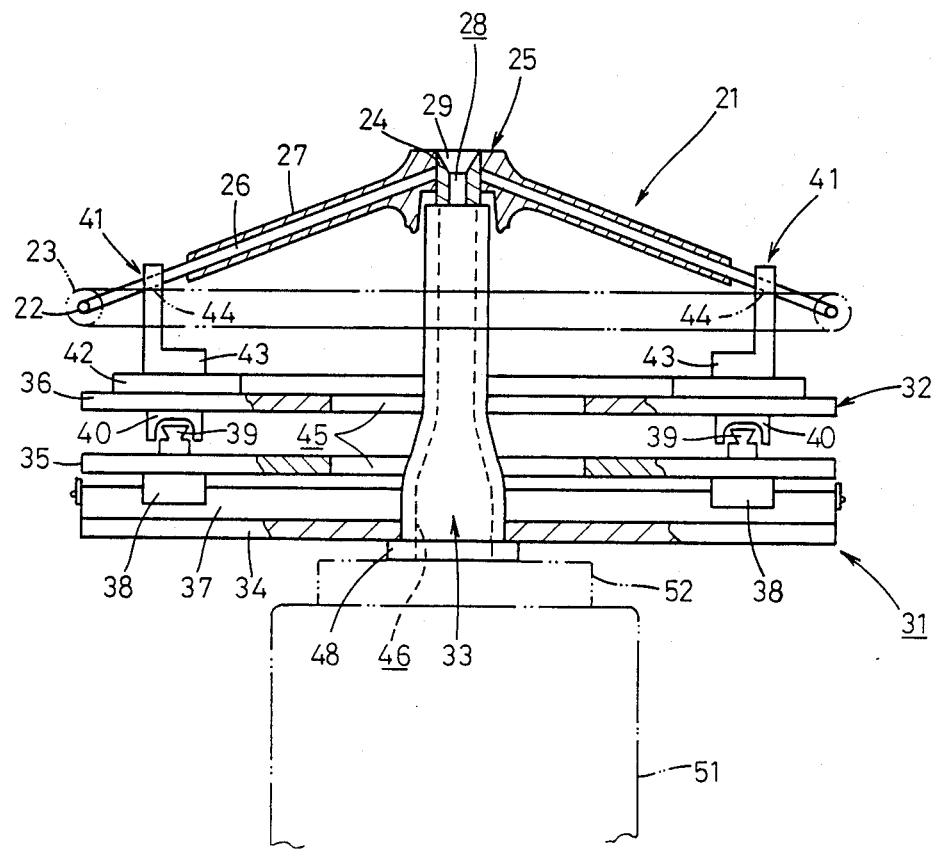
FIG. 3 is a cross-sectional view of a serrating apparatus according to an embodiment of the present invention.

As shown in FIG. 3, a steering wheel generally denoted at 21 includes an annular rim 23 having a rim core 22, boss 25 positioned at the center of the annular rim 23 and having a metallic boss 24, and spokes 27 interconnecting the boss 25 and the rim 23 and having respective spoke cores 26. The boss 24 has a through hole 28 with its inner circumferential surface to be serrated and a tapered hole 29.

A steering wheel support jig 31 of a serrating broaching machine has a mount base 32 for positioning the steering wheel 21 nonrotatably thereon and a stationary holder 33 for placing the boss 24 of the steering wheel 21 slidably thereon.

The mount base 32 includes a first movable plate 35 laterally (in a direction parallel to the sheet of FIG. 3) movably disposed on a base plate 34 fixed to the broaching machine, and a second movable plate 36 movable in a fore-and-aft direction (normal to the sheet of FIG. 3). The first movable plate 35 is movable on a pair of guide rails 37 through ball bearings 38, the guide rails 37 being disposed on the base plate 34 parallel to each other and extending in the lateral direction. The second movable plate 36 is movable on a pair of guide rails 39 through ball bearings 40, the guide rails 39 being disposed on the first movable plate 35 parallel to each other and extending in the fore-and-aft direction. Therefore, the second movable plate 36 is horizontally movable in a nonrotatable manner. A plurality of supports 41 are mounted on end portions of the second movable plate 36 in vertical alignment with the spoke cores 26 for supporting and positioning the steering wheel 21 in a nonrotatable fashion. Each of the supports 41 includes a support member 43 of a substantially L-shaped cross section which is fixedly positioned on the second movable plate 36 by an attachment plate 42. The support member 43 has a recess 44 defined in its upper end for receiving one of the spoke cores 26 of the steering wheel 21 to hold the steering wheel 21 nonrotatably. The first and second movable plates 35, 36 have central holes 45 through which the stationary holder 33 extends to avoid physical interference between the movable plates 35, 36 and the stationary holder 33.

The stationary holder 33 is in the form of a hollow cylinder having a broach insertion hole 46 defined axially therethrough. The stationary holder 33 has a lower portion fixed to the base plate 34 and an upper end for placing the boss 24 of the steering wheel 21 thereon.

A chuck frame 51 fixed to the broaching machine has a frame base 52 thereon. The frame base 52 has an upper surface held against the lower surface of the base plate 34, and also has a central opening 53 (FIG. 4) defined in the upper surface thereof. A flange 48 mounted on the lower end of the stationary holder 33 is fitted in the central opening 53, which is held in communication with the broach insertion hole 46 in the stationary holder 33.

A broach chuck 55 which is hydraulically actuatable is vertically displaceably disposed in the chuck frame 51. As shown in FIG. 4, the broach chuck 55 has a broach insertion hole 56 defined coaxially therethrough. A broach stopper 57 projects into the broach insertion hole 56 at a suitable vertical position therein. A plurality of chuck teeth 58 are disposed above the broach stopper 57 for movement into and out of the broach insertion hole 56, the chuck teeth 58 being normally urged to move away from each other by a spring (not shown). As shown in FIGS. 4 and 5, a positioning block 59 is embedded in the upper end of the broach chuck 55 in partly closing relation to the broach insertion hole 56, the positioning block 59 serving as an angular positioning means for limiting the angular orientation of a broach (described later).

A chuck cover 60 is vertically movably fitted over the broach chuck 55. The chuck cover 60 has a recess 61 defined in its inner surface for receiving the radially outer ends of the chuck teeth 58 therein. The chuck cover 60 is normally urged resiliently to move upwardly by a spring 63 disposed around the broach chuck 55 between the lower end of the chuck cover 60 and a ring 62 disposed around the broach chuck 55. The chuck cover 60 has on its lower end a flange 60a in which a bolt 64 is vertically threaded. As shown in FIG. 4, when the chuck cover 60 is in its uppermost position, the tip end of the bolt 64 abuts against a lower surface of the frame base 52, thus allowing the chuck teeth 58 to move into the recess 61.

FIG. 6 shows a serrating broach 71 in the form of a solid cylinder including an upper larger-diameter cutting region 72 having axially extending cutting teeth shaped complementarily to serrations to be formed, a smaller-diameter neck region 73 contiguous to the cutting region 72, and a stopper region 74 larger in diameter than the neck region 73. The broach 71 also has a flat surface 75 extending beneath the cutting region 72 and over sides of the neck region 73 and the stopper region 74, the flat surface 75 serving as an engaging portion for engaging the angular positioning means on the broach chuck 55.

The serrating apparatus according to the present invention is basically constructed as described above. Operation and advantages of the serrating apparatus will be described below in relation to a serrating method which is carried out by the serrating apparatus.

Prior to serrating the steering wheel 21, the steering wheel 21 is set on the mount base 32 and the stationary holder 33. More specifically, the spoke cores 26 of the steering wheel 21 are fitted respectively in the recesses 44 of the support members 43 on the upper surface of the second movable plate 36. The steering wheel 21 is now nonrotatably supported on the supports 41, with the boss 24 placed on the upper end of the stationary holder 33. At this time, the steering wheel 21 should be angularly oriented in a predetermined direction.

After the steering wheel 21 has been set in position, he broach 71 is inserted, with the stopper region 74 ahead, through the hole 28 of the boss 24 and the broach insertion hole 46 of the stationary holder 33 into the broach insertion hole 56 of the broach chuck 55. When inserting the broach 71 into the broach chuck 55, the broach 71 is angularly oriented about its own axis such that the flat surface 75 confronts the positioning block 59 on the broach chuck 55, and the positioning block 59 is held in engagement with the flat surface 75 of the broach 71. The broach 71 is thus angularly oriented with respect to the broach chuck 55.

With the broach 71 inserted in the broach insertion hole 56, the stopper region 74 is held against the broach stopper 57, and the neck region 73 faces the chuck teeth 58.

Then, the broach chuck 55 is lowered a prescribed stroke to cause the chuck cover 60 resiliently biased by the spring 63 to be lifted relatively to the broach chuck 55. The chuck teeth 58 engage the lower edge of the recess 61 of the chuck cover 60, and as the broach chuck 55 is relatively lowered, the chuck teeth 58 are displaced toward each other until finally the neck region 73 of the broach 71 is gripped by the chuck teeth 58. By thus gripping the broach 71 with the broach chuck 55, the broach chuck 55 and the broach 71 are centered in coaxial alignment with each other, and the mount base 32 supporting the steering wheel 21 thereon is horizontally moved and the boss 24 of the steering wheel 2 slides over the upper surface of the stationary holder 33 to bring the through hole 28 of the boss 24 into coaxial alignment with the broach 71 and the broach chuck 55. Since the first and second movable plates 35, 36 of the mount base 32 are displaced in mutually perpendicular directions, the centering process performed by the displacement of the mount base 32 is accurately carried out.

Then, the broach chuck 55 is lowered and the broach 71 is pulled out through the boss 24 of the steering wheel 21 to enable the cutting teeth of the cutting region 72 of the broach 71 to cut serrations on the inner surface of the through hole 28 of the boss 24.

As described above, the steering wheel 21 on the mount base 32 is angularly oriented and positioned in a certain direction by the supports 41. The broach 71 inserted in the broach chuck 55 is also angularly oriented and positioned in a certain direction by the positioning block 59 engaging the flat surface 75 of the broach 71. Therefore, the boss 24 of the steering wheel 21 and the broach 71 are always held in a certain angular relationship to each other. Therefore, serrations can be formed on the inner circumferential surface of the through hole 28 of the boss 24 at a constant position at all times.

The steering wheel 21 with the boss 24 thus serrated is mounted on the steering shaft of an automobile. When the steering wheel 21 is then kept in a neutral position to steer the automobile in a straight-ahead direction, since the steering shaft is angularly oriented in the same direction as the steering wheel 21, the angular orientation of the steering wheel 21 is always in exact agreement with the running direction of the automobile.

While in the above embodiment the horizontally movable mount base 32 is composed of the first and second movable plates 35, 36 which are movable in mutually perpendicular relation to each other, the mount base 32 may comprise only one of the first and second movable plates 35, 36.

FIGS. 7 and 8 show another embodiment in which the angular positioning means on the broach chuck 55 for limiting the angular orientation of the broach 71 comprises a key slot 76 defined in the broach chuck 55 and extending axially along the broach insertion hole 56, and the engaging portion on the broach 71 for engaging the angular positioning means comprises a key 77 projecting on the outer peripheral surface of the broach 71 and extending axially thereof. When the broach 71 is inserted in the broach chuck 55, the key 7 is fitted in the key slot 76 to angularly position the broach 71 with respect to the broach chuck 55.

With the present invention, as described above, the steering wheel is positioned and supported on the mount base while being angularly oriented in a fixed direction, and the serrating broach is inserted in the broach chuck while being angularly oriented in a fixed direction. Therefore, the boss of the steering wheel which is to be serrated and the serration broach can be held in a certain angular positional relationship to each other at all times. Therefore, the serrations formed on the boss of the steering wheel do not tend to be out of proper positional relationship to a symmetrically central position or neutral position of the steering wheel. Where the steering wheel thus serrated is mounted on the steering shaft of an automobile, the angular orientation of the steering wheel can always be kept in exact agreement with the running direction of the automobile.

Although certain preferred embodiments have been shown and described, it should be understood that many changes and modifications may be made therein without departing from the scope of the appended claims.

What is claimed is:

1. A method serrating a steering wheel by setting the steering wheel on a serrating broaching machine, inserting a serrating broach into a through hole defined in a boss of the steering wheel, and then pulling the serrating broach with a broach chuck gripping the serrating broach to cut serrations on an inner surface of the through hole in the boss, said method comprising the steps of:

positioning said steering wheel horizontally movably and nonrotatably in a prescribed angular orientation on said broaching machine while placing said boss on a holder of said broaching machine;

inserting he serrating broach through said through hole in said boss into said holder of the broaching machine while holding said serrating broach in a prescribed angular orientation around the axis thereof with respect to said broach chuck; and pulling the serrating broach from said boss with said broach chuck gripping said serrating broach to cut serrations on the inner surface of said boss.

2. An apparatus for serrating a steering wheel by setting the steering wheel on a serrating broaching machine, inserting a serrating broach into a through hole defined in a boss of the steering wheel, and then pulling the serrating broach with a broach chuck gripping the serrating broach to cut serrations on an inner surface of the through hole in the boss, said apparatus comprising:

support means horizontally movably and nonrotatably mounted on said broaching machine for positioning said steering wheel nonrotatably in a prescribed angular orientation;

a holder disposed substantially centrally in said support means for placing said boss of the steering wheel thereon;

a serrating broach insertable through said through hole in said boss, said holder, and said broach chuck; and said broach chuck having positioning means for positioning said serrating broach in a prescribed angular orientation, and being operable to grip and pull said serrating broach from said boss to cut serrations on the inner surface of said boss.

3. The apparatus according to claim 2, wherein said support means comprises a mount base horizontally movable on said broaching machine, and at least one support member fixedly mounted on said mount base and having a recess for receiving a spoke of the steering wheel.

4. The apparatus according to claim 3, wherein said mount base comprises two superposed movable plates horizontally movable in mutually perpendicular directions.

5. The apparatus according to claim 2, wherein said serrating broach has a flat surface on a side thereof which extends axially thereof, said positioning means comprising a positioning block for engaging said flat surface for holding said serrating broach in the prescribed angular orientation.

6. The apparatus according to claim 2, wherein said serrating broach has a key projecting on a side thereof and extending axially thereof, said positioning means comprising a key slot for receiving said key therein.

7. The method according to claim 1, further comprising the step of centering the steering wheel by horizontally moving said steering wheel relative to said broach chuck, said steering wheel being centered by generally aligning a center of the boss with the axis of the serrating broach.

* * * * *